United States Patent [19]
Doshi et al.

[11] Patent Number: 5,222,061
[45] Date of Patent: Jun. 22, 1993

[54] DATA SERVICES RETRANSMISSION PROCEDURE

[75] Inventors: Bharat T. Doshi, Holmdel; Subrahmanyam Dravida, Highland Park, both of N.J.; Christopher Flores, Oakland, Calif.; Pravin K. Johri, Aberdeen, N.J.

[73] Assignee: AT&T Bell Laboratories, Murray Hill, N.J.

[21] Appl. No.: 786,319

[22] Filed: Oct. 31, 1991

[51] Int. Cl.⁵ .......................... H04J 3/14; G08C 25/00
[52] U.S. Cl. .......................................... 370/13; 370/60
[58] Field of Search .................... 370/60, 94.1, 13; 371/32, 33

[56] References Cited

U.S. PATENT DOCUMENTS

| | | | |
|---|---|---|---|
| 3,876,979 | 4/1975 | Winn et al. | 340/146.1 |
| 4,439,859 | 3/1984 | Donnan | 371/32 |
| 4,712,214 | 12/1987 | Meltzer et al. | 371/32 |
| 4,928,096 | 5/1990 | Leonardo et al. | 340/825.44 |
| 4,975,952 | 12/1990 | Mabey et al. | 370/60 |
| 5,036,518 | 7/1991 | Tseung | 371/32 |
| 5,084,877 | 1/1992 | Netravali et al. | 371/32 |

Primary Examiner—Douglas W. Olms
Assistant Examiner—Alpus H. Hsu
Attorney, Agent, or Firm—F. B. Luludis

[57] ABSTRACT

A facility is provided for use in a packet switch to control unnecessary multiple retransmissions of a data packet. In an exemplary embodiment of the invention, such control is achieved by tracking in a list the sequence numbers of transmitted data packets and retransmitting a data packet only if its sequence number appears in the list prior to the sequence number of the last data packet that is received correctly by a receiver. The sequence number associated with a retransmitted data packet is deleted from the list and then appended to the list to place the number in proper relationship with the sequence numbers of data packets transmitted after the initial transmission of the retransmitted data packet.

7 Claims, 6 Drawing Sheets

FIG. 8

| TRANS_SEQ_I | SEQ_I |
|---|---|
| \| | \| |
| \| | \| |
| \| | \| |
| 973 | 848 |
| 974 | 849 |
| 975 | 850 |
| 976 | 851 |
| 977 | 852 |
| 978 | 853 |
| 979 | 854 |
| 980 | 855 |
| 981 | 856 |
| 982 | 857 |
| 983 | 858 |
| 984 | 859 |
| 985 | 860 |
| 986 | 852 |
| 987 | 861 |
| 988 | 863 |
| 989 | 864 |
| 990 | 865 |
| 991 | 866 |
| 992 | 857 |
| 993 | 867 |
| 994 | 868 |
| \| | \| |
| \| | \| |
| \| | \| |

130

DATA SERVICES RETRANSMISSION PROCEDURE

TECHNICAL FIELD

The invention relates to data transmission systems, and more particularly relates to the retransmission of data packets from a transmitter to a receiver.

BACKGROUND OF THE INVENTION

In data transmission systems, a transmitter transmits data packets, to an intended receiver via a path which may include, for example, a packet network, in which each data packet is associated with a respective sequence number. Periodically, the receiver transmits to the transmitter a control packet containing information identifying those data packets that were received correctly. Such information could be in the form of a bit map, in which the order of the bits corresponds with the order of the sequence numbers of data packets that were received correctly, incorrectly or not at all at the receiver. (Typically, the length of the bit map is large to cover a large range of sequence numbers.)

Upon receipt of the control packet, the transmitter retransmits those numbered packets which the receiver identified in the bit map as being received incorrectly or not at all. However, in a data transmission system operating at high data rates and having an appreciable propagation delay, e.g., 50 milliseconds, between the transmitter and receiver, such packet retransmissions could result in multiple retransmissions of such packet(s), and may occur even though the first retransmission of the packet(s) may have been received correctly at the receiver.

To illustrate a simple example of the problem, assume that the transmitter is transmitting to the receiver a series of sequentially numbered packets, and that prior to receipt of packet 11, the receiver returns a control packet indicating in the associated bit map field that packets 1 through 3, and 5 through 10 were received correctly. Assume that because of the aforementioned propagation delay the transmitter receives the control packet following its transmission of packet 22. At that point, the transmitter retransmits packet 4 and then transmits packet 23 and so on. Upon receipt of packet 20, but prior to receipt of retransmitted packet 4, the receiver sends to the transmitter another control packet indicating in the associated bit map field that packets 1 through 3 and 5 through 20 were received correctly. Upon receipt of the control packet, the transmitter will retransmit packet 4, even though it is likely that the receiver received that packet correctly following its receipt of packet 22.

It can be appreciated that in actual practice the problem is significantly more acute than as presented in the foregoing simple illustration. Therefore, it can also be appreciated that such retransmissions of data packets could significantly degrade the throughput of data packets from a transmitter to a receiver.

SUMMARY OF THE INVENTION

An advancement in the art of data packet networks is achieved by arranging a data transmitter so that it maintains in a list the exact sequence of transmitted packets, and arranging a data receiver so that it returns to the data transmitter a status message identifying the data packets that were received correctly and incorrectly, and by further arranging the data transmitter so that it retransmits a packet that was received incorrectly (or not at all) only if the list indicates that that packet had been transmitted prior to the data packet identified in the message as being the last of the correctly received data packets.

As an aspect of the invention, a timer is associated with each transmitted (and retransmitted) data packet to track the possibility that the receiver may not receive the last transmitted data packet or block of packets. Specifically, the last transmitted data packet is automatically retransmitted if the transmitter does not receive, within the period of time tracked by the timer, a message indicating that the last transmitted data packet was received either correctly or not correctly.

BRIEF DESCRIPTION OF THE DRAWING

In the drawing:

FIG. 8 is an improved version of the transmit list of FIG. 5;

DETAILED DESCRIPTION

Figure 1:
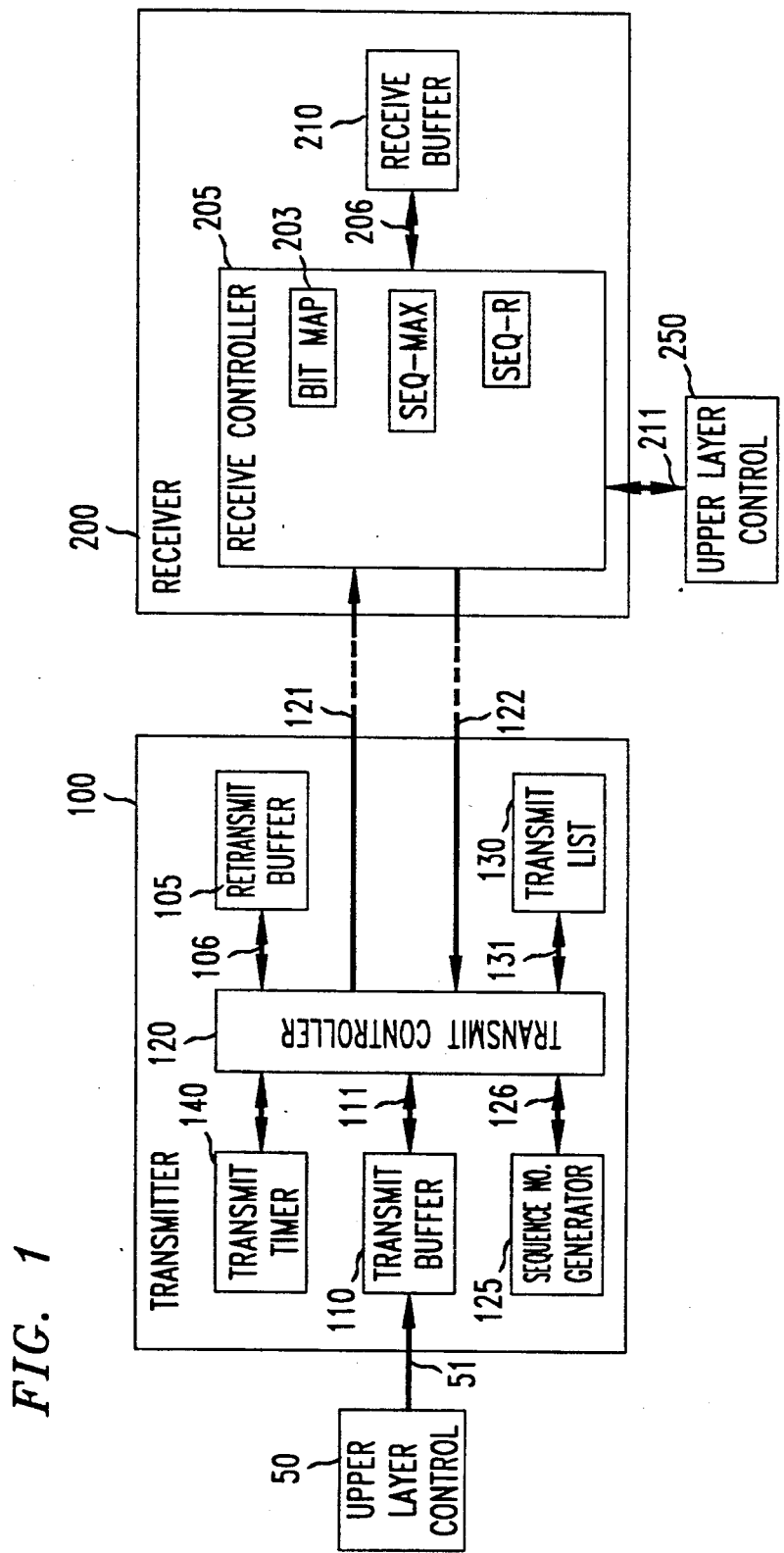
FIG. 1 is a broad block diagram of an illustrative data packet transmission system in which the principles of the invention may be practiced.

Referring now to FIG. 1, in an exemplary embodiment of the invention, transmitter 100 may constitute the transmitter section of a data terminal contained within a packet switch or host computer or within an interface unit disposed between the host and a network. Such a packet switch may be adapted to operate in accord with a predetermined protocol. Such a protocol may specify a so-called upper layer control 50, which is shown connected to transmit buffer 110 via bus 51. Buffer 110 may be a conventional memory device, for example, a First-In-First-Out (FIFO) RAM memory. A data producing processor, serving as upper layer control 50, stores in sequential memory locations of buffer 110 data packets formed from information words. After a data packet has been stored in buffer 110, it is then available for retrieval by controller 120 via bus 111. That is, controller 120 unloads data packets in the order that they have been stored in buffer 110.

The aforementioned protocol may also specify a logical link control layer defining a number of functions for interfacing a data terminal with another data terminal via a communications path for the purpose of exchanging data packets. At receiver 200, such functions include, inter alia, checking sequence numbers accompanying received data packets, error checking, generating status control messages and transmitting the messages to transmitter 100. At transmitter 100, such functions include, inter alia, the generation of sequence numbers, appending such sequence numbers to respective data packets that are to be transmitted to receiver 200 and the retransmission of those data packets which were not received correctly at receiver 200.

Figure 2:
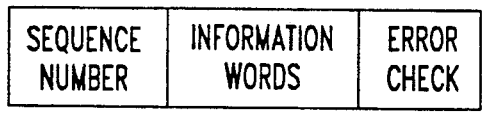
FIG. 2 is an illustrative example of the format of a data packet that is transmitted by the transmitter shown in FIG. 1.

The logical link control layer functions are implemented in transmitter 100 using, inter alia, controller 120, retransmit buffer 105 and sequence number generator 125. In particular, sequence number generator 125 may be a conventional modulo M counter, in which the value of M may be, for example, 2000. As is well-known, a counter, such as generator 125, advances the value of a current count to a next, succeeding value when it is incremented by a clock signal, for example, a clock signal (not shown) supplied by controller 120. Controller 120 accepts via bus 126 the current value generated by generator 125 and adds the value as a packet sequence number to the latest data packet that controller 120 unloads from transmit buffer 110. In addition, controller 120 generates an error check code which permits the receiver of the resulting data packet, e.g., receiver 200, to determine if the packet was received correctly. That is, that the received packet does not contain an error. The error check code could be what is commonly referred to as a cyclic redundancy code. (An illustrative example of such a data packet is shown in FIG. 2.)

After controller 120 forms a data packet in the described manner, controller 120 then sends the data packet to receiver 200 via communications path 121. (It is noted that a communications path may be a single data transmission link or it may consist of a number of packet switches and data links arranged in tandem as represented by the dashed portion of paths 121 and 122). In addition, controller 120 stores a copy of the transmitted data packet in retransmit memory buffer 105 at a location that is indexed by the current sequence number. Thus, the number of memory locations forming buffer 105 may, for the sake of convenience and not limitation, correspond with the range of numbers generated by generator 125. Accordingly, controller 120 may readily access a data packet that is stored in buffer 120 by using the sequence number associated with the packet as a buffer 120 index.

Transmitter 100 also includes transmit list 130 that may be formed from a number of sequential RAM memory locations. Such a number may, for the sake of convenience and not limitation, also correspond with the range of numbers generated by generator 125. In accord with an aspect of the invention, controller 120 appends to transmit list 130 a number indicative of the order of each data packet that controller 120 transmits, including data packets that controller 120 retransmits. The reason for maintaining transmit list 130 will be made apparent below. (It is noted that herein the term "appending" and variants of that term means adding to the list in a way which allows one to keep track of the order in which packets are transmitted.)

(It is seen from FIG. 1, that transmitter 100 also includes timer 140. The reason for maintaining timer 140 will also be made apparent below.)

Upon receipt of a data packet at receiver 200, receive controller 205 connected to communications path 121 checks the packet to see if it contains any errors. Typically, such errors occur as a result of a packet being subjected to noise as it propagates through communications path 121 or as a result of a partial loss in the intervening network. If receive controller 205 finds that the received packet contains an error, then controller 205 discards the packet. If the received packet does not contain error, then controller 205 stores the packet in receive buffer 210 via bus 206. Thereafter, controller 205 unloads from buffer 210 those packets that are in sequence and passes them in order to upper layer control 250 via bus 211. For example, if packet numbers 848 through 854 and 856 are stored in buffer 210, then controller 205 passes to upper control layer 250 packets 848 through 854, but not packet 856, since the latter packet is out of sequence. Controller 205 passes packet 856 to upper control layer 250 only after packet 855 has been received correctly and stored in buffer 210.

To track which packets have been received correctly, incorrectly, or not at all, receive controller 205 maintains in its internal memory, in accord with an aspect of the invention, a bit map 203 formed from a number of bits corresponding with respective ones of the aforementioned range of sequence numbers. When receive controller 205 receives correctly a data packet, it then sets to a particular binary value, e.g., a binary one, that bit which is positioned in the bit map in correspondence with the sequence number contained in that data packet. For example, if the sequence number of a correctly received packet happens to be, for example, 850, then controller 205 sets to a binary one the bit positioned at location 850 of bit map 203. If, on the hand, a data packet is received incorrectly, for whatever reason, or received not at all, then the value of the corresponding bit in the bit map is set to an opposite binary value, e.g., a binary zero.

Figure 3:
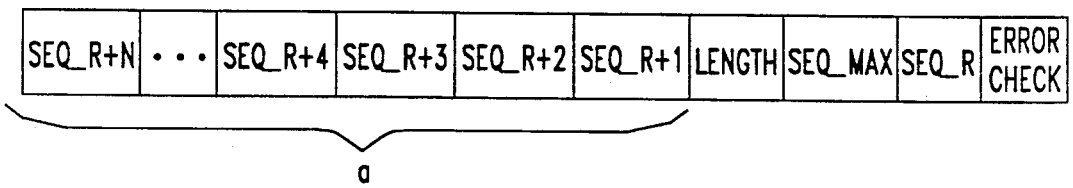
FIG. 3 is an illustrative example of the format of a status control message that the receiver of FIG. 1 returns to the transmitter of FIG. 1.

Periodically, receiver 200 sends to transmitter 100 via return bus 121 a status control message indicating, inter alia, which packets were received correctly and not correctly (or not at all). (Hereinafter, reference to packets that were received not correctly will also include packets that were not received at all.) An example of a status control message is shown in FIG. 3. In particular, the error check field contains a conventional error check code that permits the transmitter to determine whether or not the status control message contains an error. The SEQ_R field contains the sequence number of the last data packet that the receiver passed to its respective upper control layer. The SEQ_MAX field contains the sequence number of the last packet that the receiver received correctly. The Length field contains a number indicative of the length of the associated bit map field "a". Bit map field "a" is the means by which receiver 200 "tells" transmitter 100 which data packets receiver 200 received correctly or incorrectly. The bit positions of field "a" correspond with data packet sequence numbers relative to the sequence number contained in the SEQ_R field of the associated status message. Similarly, the value of a bit in bit map field "a" indicates whether the corresponding data packet was received correctly (e.g., a binary one) or incorrectly (e.g., a binary zero).

For example, if the value in field SEQ_R happened to be 848, then bit SEQ_R+1 corresponds with data packet 849, bit SEQ_R+2 with data packet 850, bit SEQ_R+3 with data packet 851, and so on.

Figure 4:
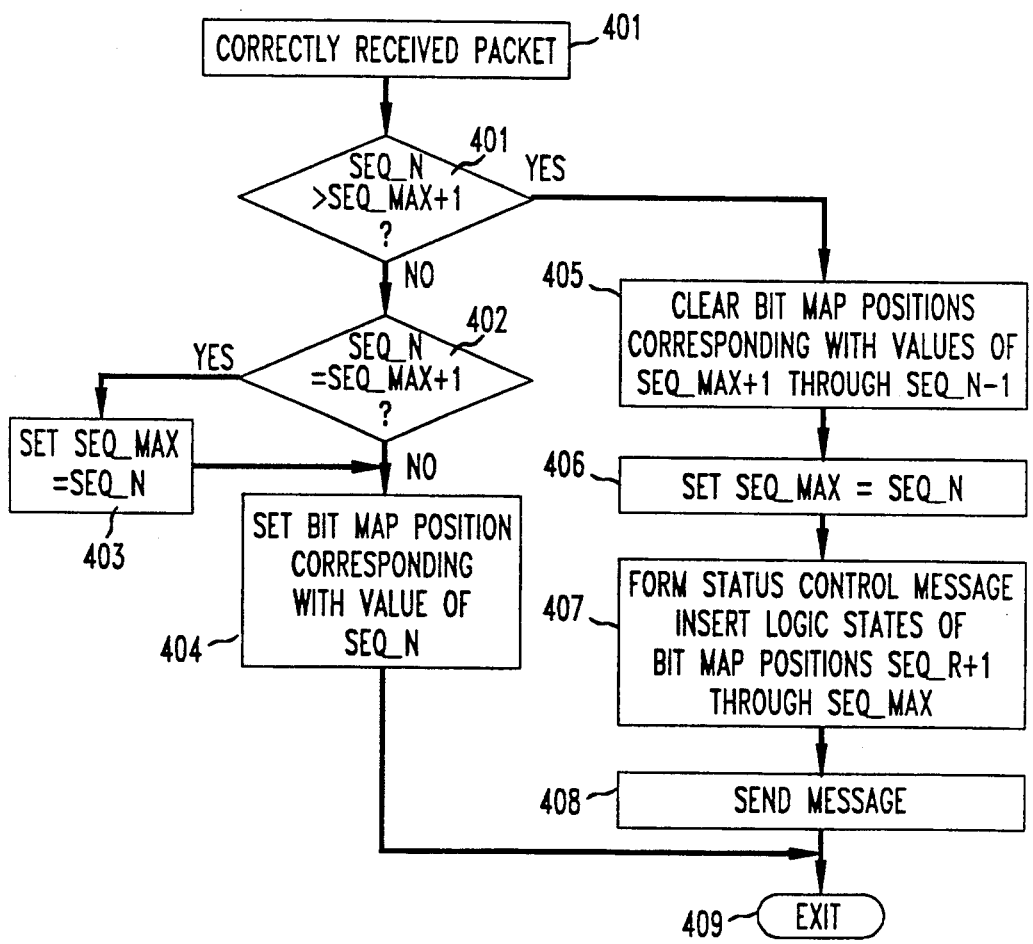
FIG. 4 is a flow chart of the program which the receiver of FIG. 1 enters to administer the status control message of FIG. 3.

In particular, the program which drives receiver controller 205 enters the program shown in FIG. 4 upon receipt of a data packet that does not contain an error. In the following discussion it is assumed that the sequence number of the correctly received packet is SEQ_N. At block 401, the program determines if the sequence number of the correctly received packet is either less or greater than the sequence number of the last correctly received data packet. The program does this by comparing the value of SEQ_N with the value of SEQ_MAX+1. If the program finds that the value of SEQ_N is equal to or less than SEQ_MAX+1, then the program proceeds to block 402. Otherwise the program proceeds to block 405.

At block 402, the program determines if the correctly received data packet is in sequence, and proceeds to block 403 if it finds that to be the case. Otherwise, the program proceeds to block 404. At block 403, the program sets the value of SEQ_MAX to the sequence number (SEQ_N) of the correctly received data packet and then proceeds to block 404. It is noted that the direct progression from block 402 to block 404 indicates that the correctly received data packet is not in sequence, and is a retransmitted data packet, since its associated sequence number is less than the value of SEQ_MAX.

At block 404, the program sets to a logic (binary) one the bit whose position in the associated bit map corresponds with the value of SEQ_N. The program then exits via block 409, and is thereafter re-entered upon receipt of the next correctly received data packet.

The program proceeding to block 405 indicates that the correctly received data packet is not in sequence and it is likely that the receiver failed to receive or received incorrectly one or more intervening data packets. As such, the program sets those bits to zero whose bit positions in the associated bit map respectively correspond with the sequence numbers of those data packets. That is, sequence numbers SEQ_MAX+1 through SEQ_N−1. The program then proceeds to block 406 where it sets SEQ_MAX equal to SEQ_N. The program then proceeds to block 407 where it forms the aforementioned status control message. At block 408, the program causes controller 205 to transmit the status control message to transmitter 100 and then exits via block 409.

Figure 5:
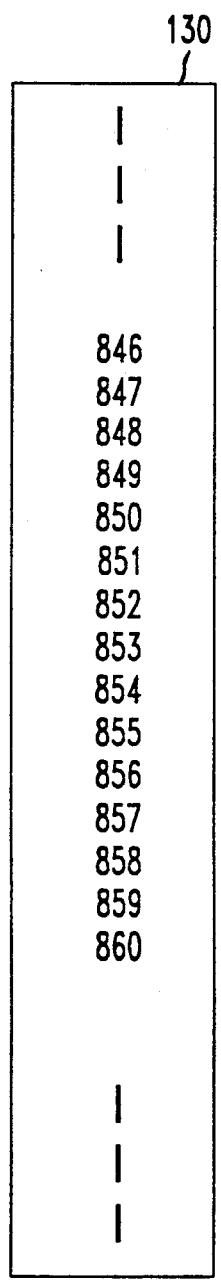
FIGS. 5-7 are illustrative examples of a transmit list that the transmitter of FIG. 1 maintains in accord with the principles of the invention.

Upon receipt of the status control message, the transmitter determines which priorly transmitted or retransmitted data packets the receiver received correctly and incorrectly. (As mentioned above, the transmitter retransmits data packets which the receiver received incorrectly.) To ensure against unnecessary multiple retransmissions of the same data packet, controller 120 maintains in transmit list 130 (FIG. 1) a running list of the sequence numbers of respective data packets that controller 120 has transmitted, as mentioned above. An illustrative example of such a list is shown in FIG. 5.

For the purposes of the following discussion, assume, for example, that transmitter 100 receives the status control message following the transmission of data packet 860 but prior to the transmission of data packet 861. Also assume that the SEQ_R and SEQ_MAX fields of the received status control message contains the values of 848 and 855 respectively, and, that except for bit position SEQ_R+4, all of the bits contained in the bit map field of the message are set to a logic one. Based on the foregoing discussion, SEQ_R+4 would correspond with sequence number 852.

Figure 6:
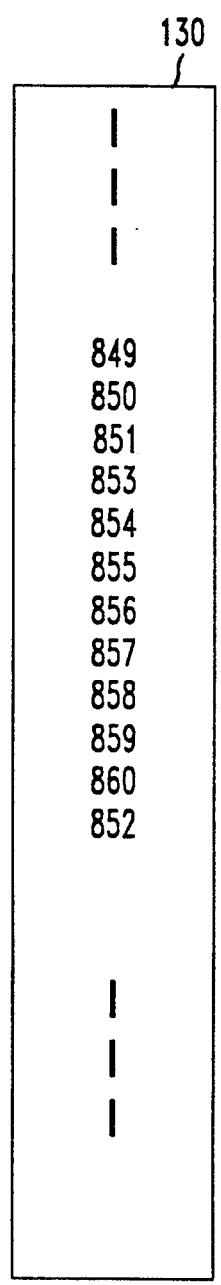

Based on the information contained in the received status control message, controller 120 erases from transmit list 130 sequence numbers up to and including SEQ_R (848). Controller 120 erases those numbers from the list since the received status message indicates that the receiver correctly received the corresponding data packets and passed them to upper control layer 150 (FIG. 1). Controller 120 also erases from retransmit buffer 105 (FIG. 1) the corresponding data packets. In addition, controller 120 retransmits data packet 852. In doing so, controller 120 erases sequence number 852 from list 130 and then appends that number to the list 130 after sequence number 860, as shown in FIG. 6. Controller 120 then resumes its normal transmission of data packets. It is assumed at this point that the list of sequence numbers in transmit list 130 begins with sequence number 849, since the numbers preceding 849 had been erased from list 130 in the described manner.

It is assumed at this point, that, following the transmission of data packet 866 but prior to the transmission of data packet 867, transmitter 100 (i.e., controller 120) receives another status control message. It is assumed that the values contained in the SEQ_R and SEQ_MAX fields of the latter message are 851 and 860, respectively. It is also assumed that, except for bit positions SEQ_R+1 and SEQ_R+6, all of the bits contained in the bit map field of the current message are set to a logic one. Based on the foregoing discussion, SEQ_R+1 and SEQ_R+6 would correspond with sequence numbers 852 and 857, respectively.

Similarly, controller 120 erases from list 130 all sequences through SEQ_R (i.e., 851). The latest status message also indicates that the receiver had not yet received correctly the data packets having relative sequence numbers SEQ_R+1 (i.e., 852) and SEQ_R+6 (i.e., 857). It is likely that, because of the appreciable propagation delay between transmitter 100 and receiver 200, the receiver may have indeed received correctly packet 852, but did so following its transmission of the latest status control message.

In prior arrangements, it is likely that the transmitter would again retransmit packet 852 even though it is likely that the receiver had already received that packet correctly, thereby making the second retransmission of packet 852 unnecessary.

Figure 7:
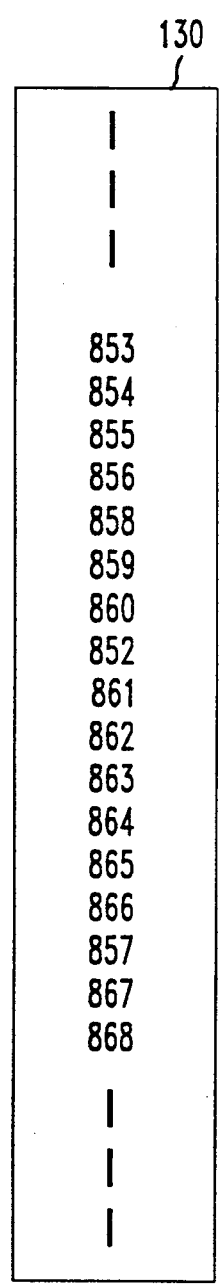

In our arrangement the transmitter would not automatically retransmit packet 852. The reason for this is that, as discussed above, the transmitter is arranged, in accord with an aspect of the invention, to retransmit only those data packets whose sequence numbers precede SEQ_MAX in transmit list 130. It is noted that as a result of the retransmission of packet 852, sequence number 852 had been erased from list 130 and then appended to that list. Accordingly, sequence number 852 now succeeds the sequence number contained in the SEQ_MAX field of the current status control message, namely sequence number 860. However, the transmitter retransmits data packet 857, since sequence number 857 currently precedes the current value of SEQ_MAX. Similarly, as a result of retransmitting data packet 857, transmitter 100 erases sequence number 857 from list 130 and then appends the number to list 130 so that it follows, or succeeds sequence number 866, as shown in FIG. 7.

In accord with an aspect of the invention, the operation of the foregoing is facilitated by associating each transmission of a data packet, as well as a retransmission thereof, with a respective transmit order number. The transmit order numbers may start with any arbitrary value and each succeeding transmit order number may be a function of the preceding order number. For example, the first transmit order number may have a value of one, and the next transmit order number may have a value of one plus one, and so on, as shown in FIG. 8.

It is seen from FIG. 8, that transmit list 130 has now been arranged to include transmit order numbers shown under the column identified by the variable TRANS_SEQ_I. The associated sequence numbers are shown under the column identified by the variable SEQ_I. Briefly, the transmitter in processing a received status control message proceeds in the manner discussed above, but uses as a reference point the transmit order number associated with SEQ_MAX, rather than SEQ_MAX. Thus, if the status control message indicates that the receiver did not receive a data packet correctly, then the transmitter retransmits the data packet only if the value of the transmit order number associated with that data packet is less than the value of the transmit order number associated with SEQ_MAX.

Consider the above example which assumed that SEQ_MAX was sequence number 860 and that the received status control message indicated that the receiver did not receive correctly data packets 852 and 857. As mentioned in the above example, data packet 852 had been retransmitted following the transmission of data packet 860. It is seen from FIG. 8 that retransmitted packet 852 is associated with transmit order number 986. Accordingly, the transmitter would not retransmit packet 852, since its associated transmit order number is greater than the transmit order number associated with SEQ_MAX. However, the transmitter would retransmit packet 857, since value of the transmit order number associated with that packet is less than the value of the transmit order number associated with SEQ_MAX. In doing so, and as mentioned above, the transmitter would erase sequence number 857 from list 130 and append it to the list following sequence number 866. In addition, the transmitter associates sequence number 857 with the next succeeding transmit order number of 992, as shown in FIG. 8.

The use of transmit order numbers to facilitate the operation of the transmitter vis-a-vis processing a received status control message will be made more apparent by the ensuing discussion, which will refer to FIG. 8 and a number of variables.

Such variables include SEQ_I, which is the sequence number associated with a data packet that is transmitted to the receiver; and TRANS_SEQ_I, which is the transmit order number associated with SEQ_I. They also include TRANS_C, which is the current value of the transmit order number; and SEQ_H, which is the corresponding sequence number of a bit having logic state of zero in the bit map field of a received status control message.

Figure 9:
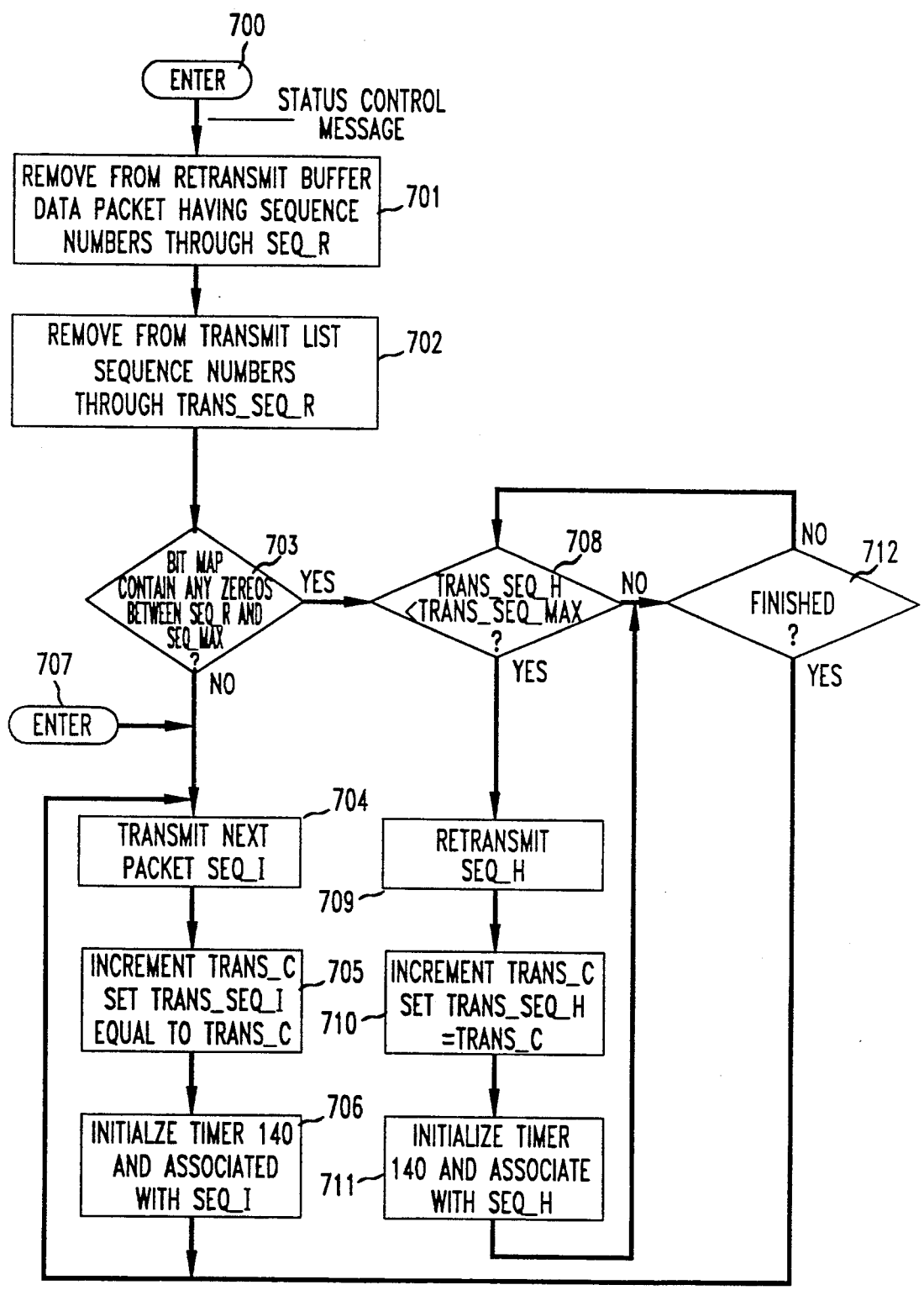
FIG. 9 is a flow chart of the program which implements the invention in the transmitter of FIG. 1.

With the foregoing in mind, we now turn to FIG. 9. In particular, the routine transmission of data packets that have been loaded in transmit buffer 110 (FIG. 1) is effected via entry into the program of FIG. 9 at block 704. At that point, the program, in the manner discussed above, transmits to the receiver a data packet that has been unloaded from transmit buffer 110. The program then proceeds to block 705 where it increments the current transmit order number value TRANS_C and appends to transmit list 130 the new value of TRANS_C and the sequence number SEQ_I associated with the transmitted data packet. The program then proceeds to block 706 where it initializes timer 140 (FIG. 1) and associates timer 140 with SEQ_I. (The reason for initializing timer 140 and associating it with the transmitted data packet will be made apparent below with reference to FIG. 10.)

When the program completes its task at block 706 it then returns to block 704 to process the next data packet that may be stored in transmit buffer 110 (FIG. 1). However, if the program finds that it received a status control message, then it proceeds to entry point 700, rather than block 704. At entry point 700, the program proceeds to block 701 where it erases from transmit buffer 110 those data packets associated with sequence numbers having values through SEQ_R. At block 702 the program erases from transmit list 130 the latter sequence numbers as well as their associated transmit order numbers. The program then proceeds to block 703.

At block 703, the program checks the bit map field contained in the received status control message to see if the map contains any zeroes. If that is not the case, then the program proceeds to block 704. Otherwise, the program proceeds to block 708. At block 708, the program determines in a conventional manner the position of the first zero in the bit map, and then associates that position with a corresponding sequence number, SEQ_H. The program then obtains from transmit list 130 (FIG. 8) the transmit order number TRANS_SEQ_H associated with SEQ_H. The program then proceeds to block 709 if it finds that the value of TRANS_SEQ_H is less than the value of the transmit order number TRANS_SEQ_MAX associated with the value of SEQ_MAX contained in the received status message. Otherwise, the program proceeds to block 712.

At block 712, the program determines if the bit map field of the received status message contains other zeroes. If the bit map contains other zeroes, then the program returns to block 708 to determine the bit position of next zero in the bit map. If the bit map does not contain other zeroes, then the program proceeds to block 704.

At block 709, the program retransmits the data packet associated with (identified by) SEQ_H and erases the latter sequence value and its associated transmit order number from transmit list 130 (FIG. 8). The program then proceeds to block 710. At block 710, the program increments the value of TRANS_C and then appends that value as well as the value of SEQ_H to transmit list 130 (FIG. 8). The program then proceeds to block 711 where it initializes timer 140 (FIG. 1) and associates timer 140 with SEQ_H. The program then proceeds to block 712.

It can be appreciated that a significant delay could occur between the transmission of data packets. For example, such a delay could occur whenever transmit buffer 110 is empty and some appreciable amount of time expires before upper control layer 50 (FIG. 1) stores in buffer 110 a new data packet. It can also be appreciated that the receiver may fail to receive from the transmitter the last transmitted data packet. In such a situation, the receiver would not notify the transmitter that the last transmitted data packet was not received. As such, the retransmission of the packet would be delayed for an appreciable period of time. The reason for this is that the transmitter would be notified that the receiver failed to receive the last transmitted data packet only after the transmitter resumes its transmission of data packets and receives from the receiver a status control message.

To deal with the problem and to retransmit a lost data packet in a timely manner, the transmitter associates a predetermined period of time with the last data packet that it transmits. In an illustrative embodiment of the invention such a period of time may be, for example, equal to the round trip delay between the transmitter and receiver. In transmitter 100, timer 140 is set to the round trip delay between transmitter 100 and receiver 200.

As mentioned above in reference to blocks 706 and 711 of FIG. 9, the program initializes, i.e., sets to zero, timer 140 and associates timer 140 with the data packet that it just transmitted.

Figure 10:
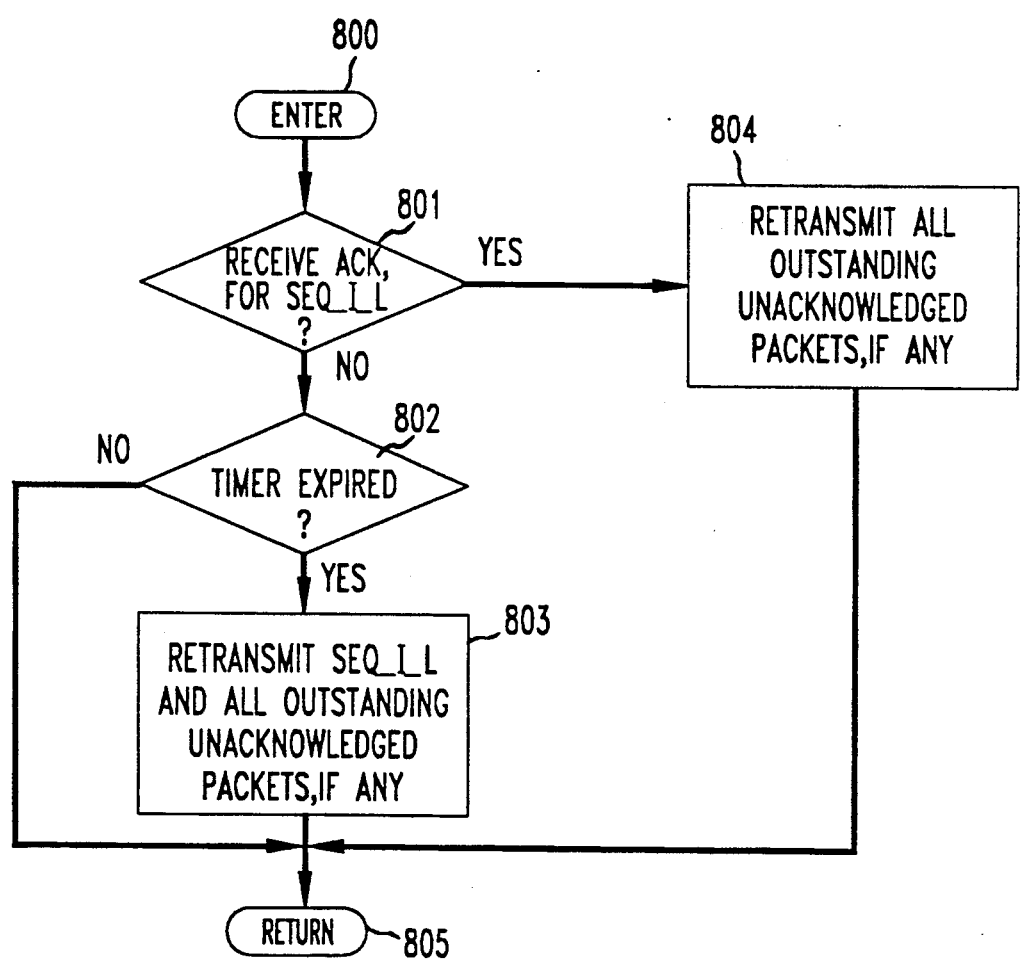
FIG. 10 is a flow chart of the program which administers the transmitter timer of FIG. 1, in accord with the principles of the invention.

Turning now to FIG. 10, there shown in flow chart form the program module which administers timer 140. The program is entered periodically, e.g., every fifty milliseconds, on an interrupt basis.

In particular, when the program is entered at block 800 it proceeds to block 801 to determine if the receiver acknowledged receipt of the data packet associated with the last sequence number, i.e., SEQ_I_L, that was appended last to list 130 (FIG. 8). If such an acknowledgement has been received, then the program proceeds to block 804. Otherwise, the program proceeds to block 802 to determine if the timer has expired. That is, the program checks the contents of timer 140 to see if the value of such contents represents the aforementioned period of time. If that is case, then the program proceeds to block 803. Otherwise, the program increments the contents of timer 140 and then exits via return block 805. At block 803, the program retransmits the data packet associated with SEQ_I_L as well as other outstanding unacknowledged data packets, if any. In doing so, the program appends to list 130, in turn, the sequence number associated with each retransmitted data packet as well as a respective TRANS_C value. The program then exits via return block 805. At block 804, except for the data packet associated with SEQ_I_L, the program retransmits all other outstanding unacknowledged data packets, if any, in the manner described for block 803. The program then exits via block 805.

The foregoing is merely illustrative of the principles of the invention. Those skilled in the art will be able to devise numerous arrangements, which, although not explicitly shown or described herein, nevertheless embody those principles that are within the spirit and scope of the claimed invention.

We claim:

1. An arrangement for use in a packet switch to control retransmission of data packets associated with respective sequence numbers, said arrangement comprising
    a transmitter and receiver of said data packets,
    means in said transmitter for generating sequential transmit order numbers, for transmitting said data packets to said receiver and for associating each of said packet sequence numbers with respective ones of said transmit order numbers based on the order in which said packets are transmitted,
    means in said receiver for returning to said transmitter a control message identifying the transmitted data packets that were received correctly and incorrectly by said receiver, and
    means in said transmitter, responsive to receipt of said control message, for retransmitting those of said incorrectly received data packets that are associated with transmit order numbers generated prior to a transmit order number associated with the sequence number of a data packet that is identified in said control message as being the last data packet to be received correctly by said receiver 2. The arrangement set forth in claim 1 wherein said means for retransmitting includes means for associating the sequence number of a retransmitted data packet with a current one of said generated transmit order numbers.

3. The arrangement set forth in claim 1 further comprising
    a timer contained in said transmitter, said timer being arranged to time a predetermined amount of time following its initialization, said means for transmitting including means for initializing said timer each time a data packet is transmitted to said receiver, and said transmitter further comprising means for retransmitting the last one of said transmitted data packets in the event that said timer reaches said predetermined amount of time prior to receiving from said receiver a message relating to said last transmitted data packet.

4. In a communications system, an arrangement for controlling retransmission of information packets, said information packets being assigned respective sequence numbers based on the order in which said information packets are generated, said arrangement comprising
    a transmitter and a receiver of said information packets,
    first means in said transmitter for generating sequential transmit order numbers,
    second means in said transmitter for transmitting said information packets to said receiver and for associating the sequence numbers assigned to respective ones of said transmitted information packets with respective ones of said sequential transmit order numbers, said association being based on the order in which said information packets are transmitted,
    means in said receiver for receiving said information packets and for returning a status message to said transmitter, said status message identifying at least the sequence numbers of information packets that said receiver received correctly and incorrectly, and
    means in said transmitter, responsive to receipt of said status message, for retransmitting those of said incorrectly received information packets whose sequence numbers are associated with transmit order numbers having values less than the transmit order number associated with the information packet identified in said status message as being the last of the correctly received information packets and for associating the sequence numbers assigned to respective ones of said retransmitted information packets with respective current ones of said sequentially generated transmit order numbers as they are generated.

5. The arrangement set forth in claim 4 wherein said transmitter further includes
    a timer arranged to time a predetermined amount of time following its initialization, said timer being initialized each time an information packet is transmitted to said receiver, and
    means operative in the event that said timer reaches said amount of time prior to receiving from said receiver a status message relating to said last transmitted information packet for then retransmitting said last transmitted information packet.

6. Apparatus for controlling retransmission of a data packet from a transmitter to a receiver comprising

- means in said transmitter for generating sequential transmit order numbers,
- means in said transmitter for transmitting to said receiver sequentially numbered data packets and for appending said sequence numbers to a list in an association with respective ones of said transmit order numbers,
- means in said transmitter for receiving from said receiver a status message identifying the sequence numbers of those of said transmitted data packets that said receiver received correctly and incorrectly, and for retransmitting those data packets identified in said message as being received incorrectly if said list indicates that the transmit order numbers associated with their respective sequence numbers were appended to said list prior the transmit order number associated with the sequence number of the data packet identified in said message as being the last to have been received correctly.

7. A method for use in a packet switch for controlling retransmission of data packets from a transmitter to a receiver of said data packets, said data packets having respective identities, said method being performed at said transmitter and comprising the steps of

- generating sequential transmit order numbers,
- transmitting to said receiver said data packets and appending their respective identities to a list in association with respective ones of said transmit order numbers as said data packets are transmitted, and
- retransmitting those of said transmitted data packets that are received incorrectly by said receiver only if their respective identities are associated in said list with transmit order numbers generated prior to a transmit order number associated with an identity assigned to a data packet that is determined to be the last data packet to be received correctly by said receiver.

* * * * *